Aug. 14, 1928.

H. MAXWELL 1,680,688

INDUCTION MOTOR

Filed Oct. 24, 1923

Inventor:
Howard Maxwell,
by Alexander S. Lunt
His Attorney.

Patented Aug. 14, 1928.

1,680,688

UNITED STATES PATENT OFFICE.

HOWARD MAXWELL, OF SCHENECTADY, NEW YORK, ASSIGNOR TO GENERAL ELECTRIC COMPANY, A CORPORATION OF NEW YORK.

INDUCTION MOTOR.

Application filed October 24, 1923. Serial No. 670,577.

My invention relates to induction motors of the so-called "squirrel-cage" type and has for its object to provide in an induction motor, of the above type, an improved rotor having improved means for changing the resistance of the windings of said rotor to insure a high starting torque with comparatively low current during the starting period, and to insure high efficiency and high power factor when the machine is running at normal speed.

Figure 1:
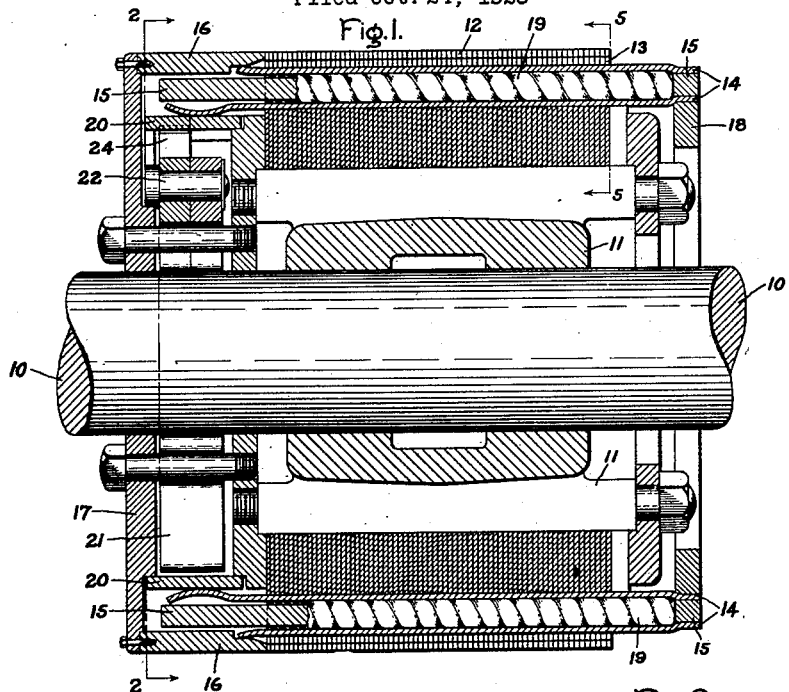
Figure 2:
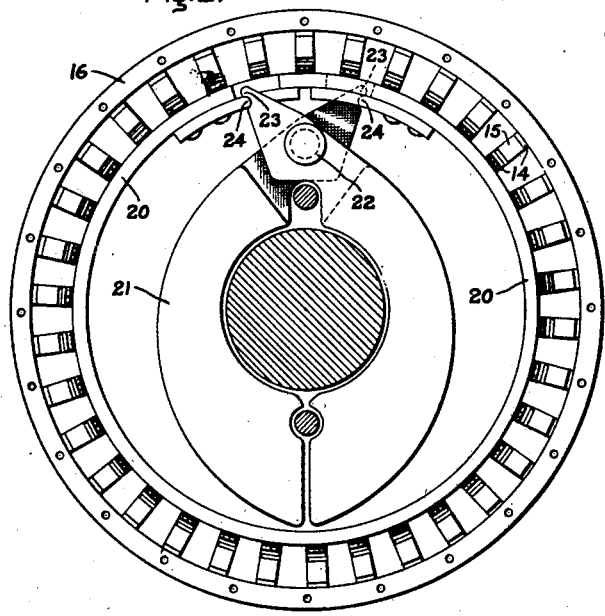
Figure 3:
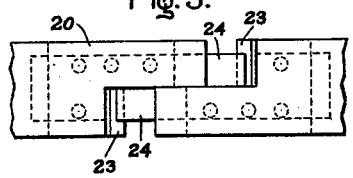
Figure 4:
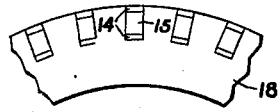
Figure 5:
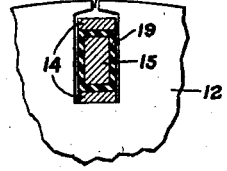

The various features of novelty which characterize my invention are pointed out in the claims annexed hereto and forming a part of this specification. For a better understanding of my invention, reference may be had to the following description taken in connection with the accompanying drawing, in which Fig. 1 is a sectional view of a rotor embodying my invention; Fig. 2 is an end view of the rotor shown in Fig. 1 with the end plate removed as shown by line 2—2; Fig. 3 is a fragmentary view of the expanding ring shown in Fig. 2; Fig. 4 is a fragmentary view of one of the end or conducting rings, and Fig. 5 is a sectional view of the conductors taken along line 5—5 of Fig. 1.

In Fig. 1 of the drawing the rotor of this embodiment of my invention is shown as having conductor slots 13 in which are located conductors 14 and 15, which are movable and adapted to be connected to an end ring 16 to cause the resistance of the rotor to be changed as the motor is started.

The conductors 14 and 15 form windings of different resistances, one of low resistance and another of high resistance. The slots 13 of the rotor as shown in Fig. 5 of the drawing are made sufficiently large to permit a small amount of radial movement of the conductors 14 and 15, and means, independent of the conductors, are provided on the rotor which operate to displace said conductors and short circuit the low resistance winding. This means can be either hand operated or automatic. If automatic it may be operated in any suitable way in response to an increase of speed in the motor by a circuit closer, which operates in response to centrifugal force as the motor speed increases. A low resistance end ring 18 is provided at one end of the rotor which is common to both of the windings formed by conductors 14 and 15 and a second low resistance end ring 16 at the other end of the rotor is provided which is common to both windings when the motor is operating above a predetermined speed.

In order to insure a uniform contact pressure between the individual conductors 15 and the low resistance end-ring 16, and an even distribution of the induced current in the conductors 14, resilient means are provided between the conductors 15 and the end-ring 16. In the embodiment of my invention shown and described, the resilient means are formed on the ends of and integral with the high resistance conductors 14. The conductors 14 are made of high resistance material having good elastic properties such as phosphor bronze, hard brass or steel. These conductors 14, in addition to providing a high resistance winding, operate because of their arrangement and elastic properties, to equalize the contact pressure exerted by the short circuiting means on the individual conductors and thereby insure a uniform contact pressure between each of the low resistance conductors 15 and the short circuiting end-ring 16. I thus insert an individual spring action for each conductor in series with the pressure exerted by the expanding ring 20, and thus tend to compensate for any inequalities in the dimensions of the parts and make uniform the pressure on each conductor.

In some cases high resistance conductors of steel can be used with good effect to increase artificially the reactance of the rotor winding.

Interposed between the two sections of the conductors 14 are conductors 15 which are composed of a low resistance conducting material such as copper. These conductors 15 are maintained by conductor 14 in a position out of contact with the end or conducting ring 16 until the motor has reached a predetermined speed.

The high resistance conductors 14 and the low resistance conductors 15 are securely fastened together as by brazing or welding at one end to a low resistance end ring 18 as shown in Fig. 4 of the drawing, and are insulated from each other within the slots 13 by insulation 19 which surrounds the low resistance conductors 15, as shown in Fig. 5 of the drawing. The high resistance conductors 14 are shown as in two parts, one part arranged in the slots 13 above the low resistance conductor 15 and the other part in the slots 13 below the conductors 15.

The upper part of the high resistance conductor 14 is bowed outward at its free end and makes contact with the end ring 16 and causes the low resistance conductor 15 to break contact with the end ring 16. The lower part of the high resistance conductor is bowed inward at its free end and engages an expansible ring 20 which is expanded by weights 21 arranged to move in response to centrifugal force. The weights 21 are pivoted on a stud 22 which engages a slot in the end plate 17. This mounting permits the stud 22 to move radially as the weights 21 respond to centrifugal force. Each of the weights 21 have a nose 23 which engages a lip 24 formed on the expansible ring 20.

The operation of this embodiment of my invention is as follows: Assume that the rotor is stationary and that the line switch is open. When the line switch is closed and the stator is energized, current will be induced in the high resistance conductors 14 and will circulate through the conductors 14, end-ring 18 and also end-ring 16 and the expansible ring 20. At this time, that is, when the motor is at a standstill, the low resistance winding 15 will be out of contact with end ring 16 and its circuit will, therefore, be opened. The contact resistance at the free ends of the conductors 14, together with their resistance, form a high resistance circuit which will give the desired starting torque with a comparatively small current. As the rotor speed increases the weights 21 will be thrown outward by centrifugal force and exert a pressure by means of the noses 23 and lips 24 on the expansible ring 20 and cause it to expand. As the ring 20 expands it changes the contact pressure between the conductors 14 and the aforementioned end ring and thereby changes the resistance of the high resistance circuit. When the speed of the motor has reached a predetermined speed the low resistance conductors 15 will come into contact with the end-ring 16 and cause the low resistance conductors to take a position in which the separated ends will be electrically connected together. At first the contact pressure between the low resistance conductors 15 and the end-ring 16 will be low and the contact resistance will be comparatively high. As the motor speeds up the contact pressure will steadily increase and thereby decrease the above-mentioned contact resistance until the rotor is running at its normal speed. When the low resistance conductors are electrically connected to the end ring 16, the combined conductors will afford a path for the induced current having sufficiently low resistance and large capacity to carry full load current without abnormal heating. It will therefore be seen that I have produced an induction motor of the squirrel-cage type which has the desirable characteristics of an induction motor of the wound-rotor type.

Having described my invention in accordance with the patent statutes, I desire to have it understood that I do not limit myself to the specific arrangement described and that I do not limit myself to a high resistance conductor composed of two parts, as the same results can be obtained with only one of the parts shown, but aim in the appended claims to cover all modifications which do not depart from the spirit and scope of my invention.

What I claim as new and desire to secure by Letters Patent of the United States, is:—

1. In an induction motor of the squirrel-cage type, the combination of a rotor having conductor slots therein, a high resistance winding and a low resistance winding in said slots, an end ring at one end of said rotor common to both windings, a second end ring at the other end of said rotor common to both windings when said motor is operating above a predetermined speed, said high resistance winding being permanently closed by said end rings, and means cooperating with said high resistance winding to open and close the circuits of said low resistance winding as the speed of said motor changes.

2. In an induction motor of the squirrel-cage type, the combination of a rotor having slots therein, low resistance and high resistance conductors in each of said slots, end-rings for said conductors, said high resistance conductors being in permanent contact with said end-rings to form a high resistance winding and adapted to bias said low resistance conductors out of contact with said end-rings, and means to overcome said bias and to electrically connect said low resistance conductors to said end-rings to form a low resistance winding.

3. In an induction motor of the squirrel-cage type, the combination of a rotor having conductor slots therein, conductors in said slots forming a high and a low resistance winding, end-rings, and means independent of said windings cooperating with said high resistance winding to move said low resistance winding into and out of operative connection with said end-rings.

4. In an induction motor of the squirrel-cage type, the combination of a rotor having slots therein, high resistance and low resistance conductors in said slots, end rings, centrifugally responsive means for moving said low resistance conductors into engagement with one of said end-rings, and resilient means formed on the ends of said high resistance conductors for equalizing the pressure between said last mentioned end-ring and each of said low resistance conductors.

5. In an induction motor of the squirrel-cage type, the combination of a rotor having slots therein, conductors in said slots forming a high and a low resistance winding, end-rings, means cooperating with said high resistance winding to move said low resistance winding into and out of operative connection with one of said end-rings, and resilient means formed on the ends of said high resistance conductors for equalizing the pressure between said end-ring and each of said low resistance conductors.

6. In an induction motor of the squirrel-cage type, the combination of a rotor having conductor slots therein, a high resistance winding and a low resistance winding in each of said slots, an end ring at one end of said rotor common to both of said windings, a second end ring at the other end of said rotor common to both of said windings when said motor is operating above a predetermined speed, said high resistance winding being permanently connected to said end-rings and said low resistance winding being out of contact with one of said end rings when the motor is at a standstill, and means cooperating with said high resistance winding for closing the circuit of said low resistance winding when the motor is operating above a predetermined speed.

7. In an induction motor of the squirrel-cage type, the combination of a rotor having conductor slots therein, a high resistance winding and a low resistance winding in said slots, an end ring at one end of said rotor common to both of said windings, a second end ring at the other end of said rotor common to both windings when said motor is operating above a predetermined speed, said high resistance winding being permanently connected to said end-rings and means cooperating with said high resistance winding for automatically opening and closing the circuit of said low resistance winding in response to changes in the speed of said motor.

8. An induction motor having a rotor provided with slots, a squirrel cage winding comprising conductors in the slots and fixed end rings therefor, and means independent of the conductors for pressing the same against one of said end rings to decrease the resistance of the winding as the rotor speed increases.

9. An induction motor having a rotor provided with slots, a squirrel cage winding comprising conductors in the slots and fixed end rings therefor, and centrifugally responsive means independent of the conductors for pressing the same against one of said end rings to decrease the resistance of the winding as the rotor speed increases.

10. In an induction motor of the squirrel-cage type, the combination of a rotor having slots therein, conductors in said slots forming a winding, end-rings for said conductors, and means comprising an expansible ring and weights adapted to move in response to centrifugal force to cause the contact pressure between said conductors and said end-rings to be varied for changing the resistance of said winding.

11. An induction motor having a rotor provided with slots, a squirrel cage winding therefor comprising conductors in the slots, an end ring permanently secured to said conductors at one end thereof, and a fixed end ring adjacent the opposite ends of said conductors, and means independent of the conductors for causing the conductors to contact with said fixed ring to vary the resistance of the winding as the motor starts.

12. An induction motor having a rotor provided with slots, a squirrel cage winding therefor comprising conductors in the slots, an end ring permanently secured to said conductors at one end thereof, and a fixed end ring adjacent the opposite ends of said conductors, and centrifugally responsive means independent of the conductors for causing the conductors to engage said fixed ring with a variable pressure dependent upon the speed of the rotor.

13. In an induction motor of the squirrel-cage type, the combination of a rotor having conductor slots therein, high resistance and low resistance conductors in said slots, end-rings for said conductors, centrifugal means on said rotor, said high resistance conductors being arranged to cooperate with said centrifugal means to close the circuit of said low resistance winding when the motor has reached a predetermined speed.

14. In an induction motor of the squirrel-cage type, the combination of a rotor, said rotor having conductor slots, a high resistance winding and a low resistance winding in said slots, end-rings common to each of the above windings, said high resistance winding being permanently in contact with said end-rings, and centrifugal means comprising an expansible ring in contact with said high resistance winding and weights adapted to move in response to centrifugal force and expand said expansible ring to move said windings and reduce their total resistance.

In witness whereof, I have hereunto set my hand this 23rd day of October, 1923.

HOWARD MAXWELL.